US012628944B2

(12) United States Patent
Kim

(10) Patent No.: US 12,628,944 B2
(45) Date of Patent: May 19, 2026

(54) TRANSLUCENT STONE TABLE

(71) Applicant: Juyeon Kim, Suwon-si (KR)

(72) Inventor: Juyeon Kim, Suwon-si (KR)

( * ) Notice: Subject to any disclaimer, the term of this patent is extended or adjusted under 35 U.S.C. 154(b) by 51 days.

(21) Appl. No.: 18/699,052

(22) PCT Filed: Sep. 1, 2022

(86) PCT No.: PCT/KR2022/013146
§ 371 (c)(1),
(2) Date: Apr. 5, 2024

(87) PCT Pub. No.: WO2023/058911
PCT Pub. Date: Apr. 13, 2023

(65) Prior Publication Data
US 2024/0398110 A1 Dec. 5, 2024

(30) Foreign Application Priority Data
Oct. 7, 2021 (KR) ......................... 10-2021-0133166

(51) Int. Cl.
*A47B 13/08* (2006.01)
*G02B 5/08* (2006.01)
(52) U.S. Cl.
CPC ............... *A47B 13/08* (2013.01); *G02B 5/08* (2013.01); *A47B 2220/0077* (2013.01)
(58) Field of Classification Search
CPC ... A47B 13/08; A47B 13/12; A47B 2013/125; A47B 2220/0077; A47B 2220/0075; A47B 2200/06
See application file for complete search history.

(56) References Cited

U.S. PATENT DOCUMENTS

| | | | | |
|---|---|---|---|---|
| 4,248,162 | A | * | 2/1981 | Skeist .................... A47B 13/08 |
| | | | | 108/50.13 |
| 4,843,524 | A | * | 6/1989 | Krent ................... G02B 6/0003 |
| | | | | 362/127 |
| 10,241,252 | B1 | * | 3/2019 | Grzeskowiak, II ....... E04C 1/42 |
| 2009/0116241 | A1 | * | 5/2009 | Ashoff ................... G02B 6/005 |
| | | | | 362/253 |
| 2014/0096707 | A1 | * | 4/2014 | Westbrook ............. A47B 13/00 |
| | | | | 108/50.13 |
| 2015/0300627 | A1 | * | 10/2015 | Wang .................. F21V 33/0012 |
| | | | | 362/127 |
| 2019/0391316 | A1 | * | 12/2019 | Masuda ............... G02B 6/0076 |
| 2021/0100358 | A1 | * | 4/2021 | Mims .................... G06Q 20/204 |
| 2021/0177133 | A1 | * | 6/2021 | Thompson ............. A47B 3/083 |

(Continued)

FOREIGN PATENT DOCUMENTS

| | | |
|---|---|---|
| CN | 113339726 A | 9/2021 |
| JP | 2007-89952 A | 4/2007 |

(Continued)

OTHER PUBLICATIONS

International Search Report issued Feb. 3, 2023 in International Application No. PCT/KR2022/013146.

*Primary Examiner* — Daniel J Rohrhoff
(74) *Attorney, Agent, or Firm* — Sughrue Mion, PLLC

(57) ABSTRACT

A translucent stone table is disclosed. The translucent stone table includes a stone panel; a case supporting the stone panel; and a light emitting unit located within the case and configured to project light towards the stone panel to allow the stone panel to emit light.

6 Claims, 7 Drawing Sheets

(56)  References Cited

U.S. PATENT DOCUMENTS

| 2023/0057955 | A1* | 2/2023 | You | A47B 13/083 |
| 2023/0284774 | A1* | 9/2023 | Hu | A63F 13/215 |
| 2024/0410604 | A1* | 12/2024 | Fioroni | B01D 46/4245 |

FOREIGN PATENT DOCUMENTS

| JP | 3219564 | U | 1/2019 |
| KR | 10-2011-0054272 | A | 5/2011 |
| KR | 10-2016-0065471 | A | 6/2016 |
| KR | 10-1680166 | B1 | 11/2016 |
| KR | 10-2020-0077064 | A | 6/2020 |

* cited by examiner

TRANSLUCENT STONE TABLE

CROSS-REFERENCE TO RELATED APPLICATIONS

This is a National Stage of International Application No. PCT/KR2022/013146 filed Sep. 1, 2022, claiming priority based on Korean Patent Application No. 10-2021-0133166 filed Oct. 7, 2021.

TECHNICAL FIELD

The present invention relates to a table, more specifically to a table using translucent stone that partially transmits external light.

BACKGROUND ART

Recently, there has been an increasing desire to create a more cozy and diverse living space in line with the societal emphasis on Work and Life Balance (WLB). As part of this trend, there is a growing demand to redecorate indoor interiors or change the surrounding environment of tables to experience a new atmosphere.

In this context, various lighting fixtures that can create diverse atmospheres around the table using lighting have been introduced. These lighting fixtures can be divided into stand-type lighting fixtures designed to be installed in a separate space at a certain distance from the table, and table lighting fixtures installed directly on the table top to provide various forms of lighting on the table top.

While these lighting fixtures have the advantage of creating various atmospheres around the table, they also come with several inconveniences.

Firstly, these lighting fixtures have the drawback that they occupy a certain area of the space around the table or a certain portion of the table top, making it difficult for users to efficiently utilize both the table space and the surrounding area.

Moreover, these lighting fixtures are equipped with wired power supply lines that connect to the socket for illuminating the fixture. These power supply lines, aside from being aesthetically unpleasing, pose risks of obstructing user movement and potential hazards if not handled carefully. Additionally, in the case of table lighting fixtures, users must either drag the power supply line along when moving the table or disconnect and reconnect the plug to another socket, limiting mobility and convenience, particularly when no other sockets are available.

DISCLOSURE

Technical Problem

The purpose of the present invention is to provide a translucent stone table that not only offers various lighting effects but also enhances space utilization while providing table functionality.

Another object of the present invention is to provide a translucent stone table that eliminates wired power supply lines, allowing easy mobility without spatial constraints.

The objects of the present invention are not limited to the above-mentioned objects, and other objects not mentioned can be clearly understood to those skilled in the art from the following description.

Technical Solution

According to an aspect of the present invention provides, a translucent stone table including: a stone panel; a case supporting the stone panel; and a light emitting unit located within the case to project light towards the stone panel, allowing the stone panel to emit light.

The light emitting unit is arranged at a distance of 5 mm to 200 mm from the bottom surface of the stone panel, and the stone panel may be configured to refract light collected from the light emitting unit into emitting-refractive particles, which re-emit light, and scattering-refractive particles, which scatter light received from emitting-refractive particles in multiple directions, allowing the emitted light from the light emitting unit to be output in the form of surface illumination.

The translucent stone table further includes a floor reflector plate disposed within the case and supporting the light emitting unit; and a inclined reflector plate extending from the floor reflector plate and formed to slope upward toward the stone panel, collecting light reflected from the floor reflector plate and reflecting it back toward the stone panel, wherein the light emitting unit may be installed to emit light toward the floor reflector plate.

The light emitting unit may comprise an LED module projecting light toward the stone panel, a dimming controller connected to the LED module to regulate the light output from the LED module, and a wireless control unit connected to the dimming controller and controlling the dimming controller via wireless signals received through one or more communication methods such as RF, WIFI, Bluetooth, or IR.

The translucent stone table may further include a rechargeable secondary battery supplying power to the light emitting unit, and an adapter connected to the secondary battery and converting power supplied from an external power source into power with a voltage of 5V, 9V, 12V, or 24V to supply the secondary battery.

The translucent stone table may additionally include a bone conduction speaker attached detachably to the stone panel to allow the stone panel to vibrate and produce sound, wherein the case comprises a housing supporting the stone panel, a resonance space formed within the housing to amplify sound output from the stone panel, and a sound output hole penetrating the housing to output the amplified sound from the resonance space to the exterior of the housing.

The translucent stone table further includes a thermoelectric module arranged between the bottom surface of the stone panel and the light emitting unit, a blower fan arranged within the case, and a fragrance storage compartment placed on one side of the light emitting unit, wherein the power generated by the thermoelectric module is supplied to the blower fan, and the blower fan may be configured to blow air toward the fragrance storage compartment.

Advantageous Effects

According to the translucent stone table related according to an embodiment of the present invention, various lighting effects as well as table functions can be provided. Moreover, with lighting functionality integrated within the table, lighting functions can be provided without separate lighting fixtures, thereby eliminating the need for space for lighting fixture installation and enhancing space utilization.

Furthermore, by eliminating wired power supply lines, not only is mobility facilitated but also a wide range of mobility without distance constraints is provided to users.

The effects according to the embodiments of the present invention are not limited by the contents exemplified above, and other various effects are included in the present specification.

MODE OF THE INVENTION

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms defined in consideration of functions in the present disclosure may vary depending on the intention of a user or an operator or usual practice. However, the present disclosure is not limited to exemplary embodiments disclosed below but may be implemented in various forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Throughout the specification, when a part "includes" or "comprises" an element, unless there is a particular description contrary thereto, the part can further include other elements. Also, throughout the specification, the term "portion" or "unit" means a unit of processing at least one function or operation and may be implemented in a hardware component, a software component, or a combination of software and hardware components.

Hereinafter, the translucent stone table according to an embodiment of the present invention is described in detail with reference to the accompanying drawings. Even for different embodiments, similar or identical reference numbers are assigned to corresponding components, and the description proceeds from the initial explanation.

Figure 1:
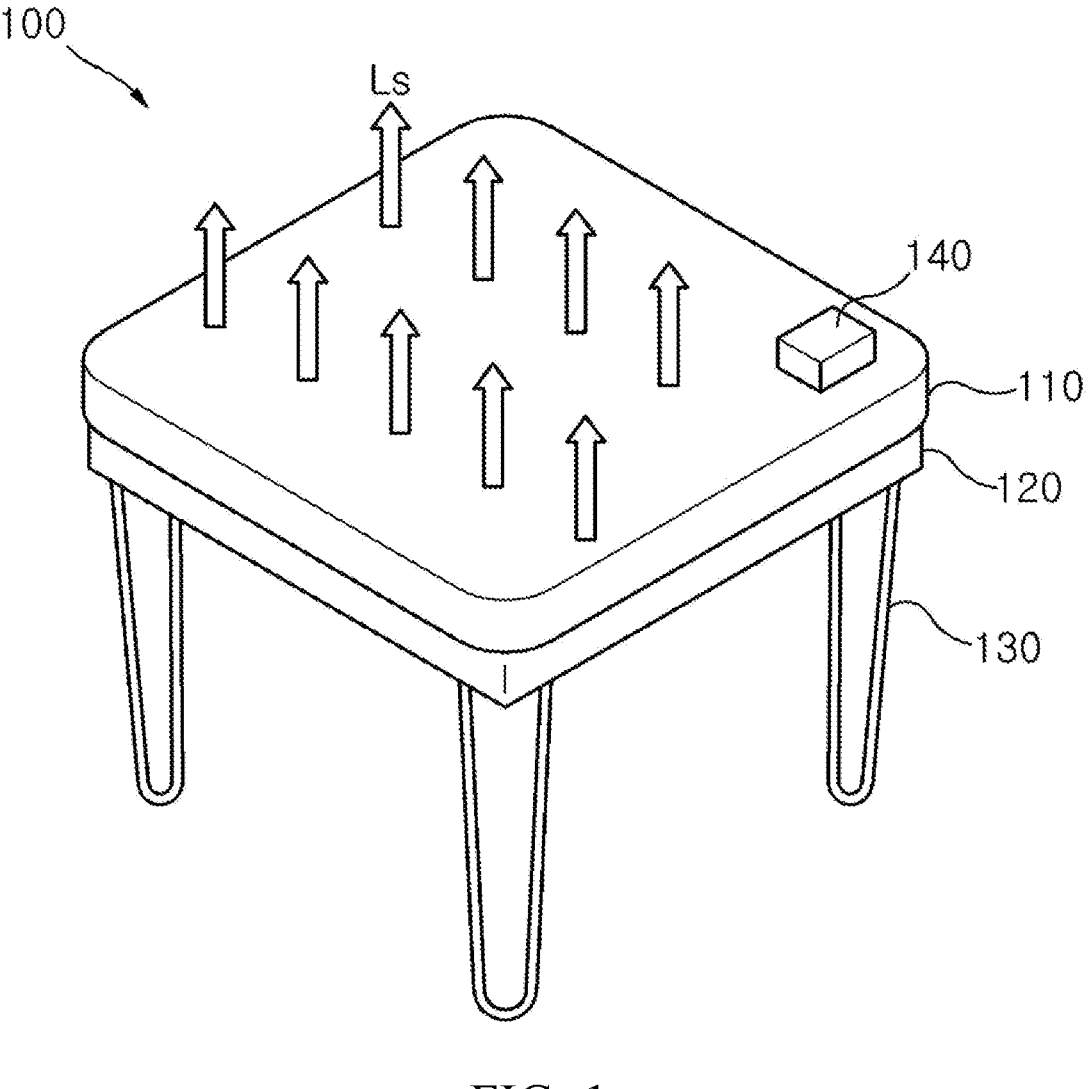
FIG. 1 is a front view of the translucent stone table according to one embodiment of the present invention.

FIG. 1 is a perspective view of a translucent stone table (100) according to one embodiment of the present invention.

Referring to this drawing, the translucent stone table (100) has an overall appearance similar to conventional tables. The translucent stone table (100) can have sizes corresponding to those of mini tables as shown in this drawing. Additionally, the translucent stone table (100) can also be configured with larger sizes corresponding to office or multi-person tables.

Such a translucent stone table (100) may include a stone panel (110), a case (120), and legs (130). Furthermore, the translucent stone table (100) may further include bone conduction speakers (140). Detailed descriptions of the components of the translucent stone table (100) will be provided with reference to FIG. 2 and FIG. 3 below.

Figure 2:
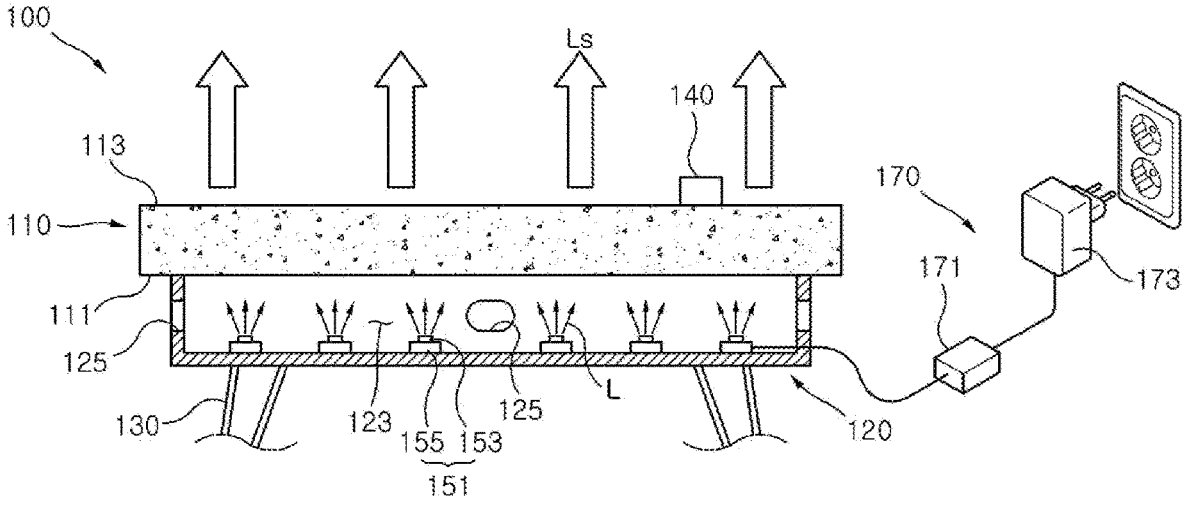
FIG. 2 is a side view of the translucent stone table of FIG. 1.
Figure 3:
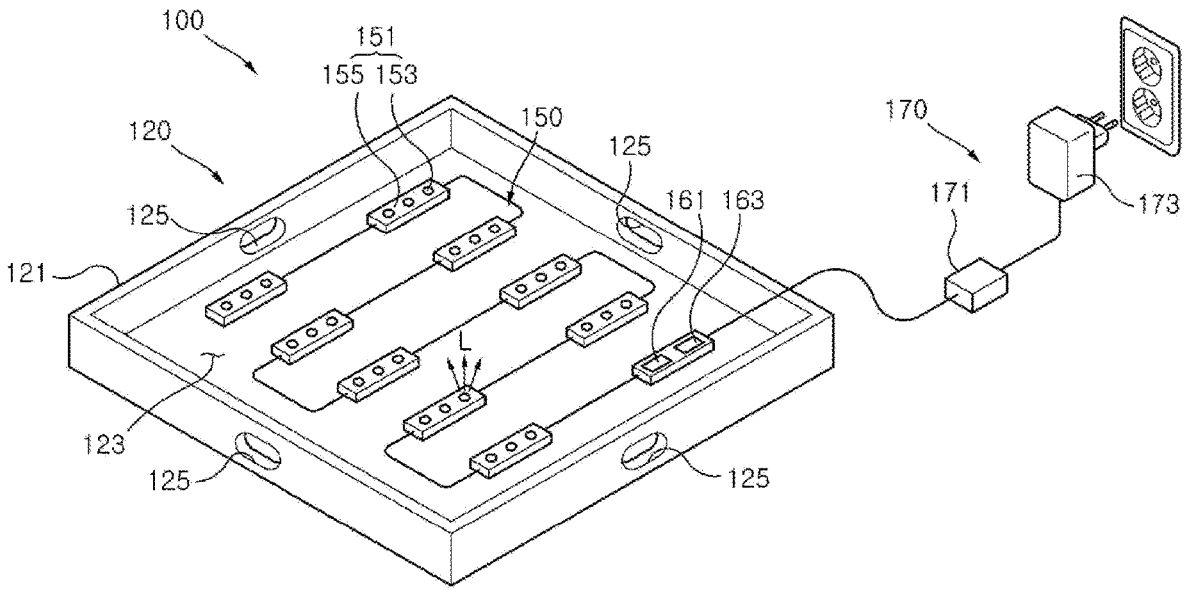
FIG. 3 is a diagram showing the interior of the translucent stone table of FIG. 1.

FIG. 2 is a side view of the translucent stone table (100) of FIG. 1, and FIG. 3 is a diagram showing the interior of the translucent stone table (100) of FIG. 1.

Referring to these drawings, the translucent stone table (100) may include a stone panel (110), a case (120), a lighting unit (150), and a power supply unit (170). Additionally, the translucent stone table (100) may further include bone conduction speakers (140).

The stone panel (110) has a thickness of 5 mm to 20 mm. The stone panel (110) may be made of one or more of marble, granite, or quartz stone. The stone panel (110) made of these stones may include light-transmitting particles and light-scattering particles.

Light-transmitting particles are particles that refract and emit light (L) transmitted from the lighting unit (150). Light-transmitting particles may include quartz or calcium carbonate. Here, quartz may contain crystalline structures. Crystals refer to the state in which quartz crystallizes and grows, also known as crystals. Crystals exhibit various colors due to trace elements included and lattice defects within their structure, and they are classified based on their colors. Specifically, quartz is classified into various types such as amethyst, rose quartz, smoky quartz, citrine, and milky quartz, depending on their colors.

Light-scattering particles are particles that scatter and emit light (L) transmitted from the light-transmitting particles in multiple directions. Light-scattering particles may contain iron, copper, calcium, aluminum, magnesium, zinc, or titanium. Generally, these materials have low light transmission rates and function to reflect or scatter light (L) in multiple directions.

The case (120) may include a housing (121), a resonance chamber (123), and sound output holes (125).

The housing (121) is a structure that supports the stone panel (110). The housing (121) may have a cuboid shape with an open top. The housing (121) may be made of acrylic, Formica, polycarbonate, aluminum, stainless steel, iron, or wood.

Here, wood may include solid wood, engineered wood, MDF (Medium Density Fiberboard), eco boards, particle boards, plywood, or laminated wood.

The resonance chamber (123) is a space formed inside the housing (121).

The sound output holes (125) penetrate through the outer wall of the housing (121).

The bone conduction speaker (140) is detachably attached to the stone panel (110). The bone conduction speaker (140) is configured to receive acoustic signals, convert them into vibration signals, and transmit the vibration signals to the stone panel (110).

The lighting unit (150) is located inside the case (120). The lighting unit (150) may include an LED module (151), a dimming controller (161), and a wireless control unit (163).

The LED module (151) projects light (L) toward the stone panel (110). The LED module (151) can be arranged at a distance of 5 mm to 200 mm from the bottom surface (111) of the stone panel (110). The configuration for emitting light from the LED module (151) may consist of luminescent LED chips (153) combined with a PCB board (155). Additionally, besides the three-module configuration shown in the drawing, the LED module (151) can also be applied in other forms such as LED strips, LED blocks, surface-emitting LEDs, LED ropes, or LED bars.

The dimming controller (161) is connected to the LED module (151) to regulate the light intensity output from the LED module (151).

Depending on the design of the case (120), the dimming controller (161) can be placed inside or outside the case (120).

The wireless control unit (163) is configured to control the dimming controller (161). For this purpose, the wireless control unit (163) receives wireless signals from external sources via one or more communication methods such as RF, Wifi, Bluetooth, or IR, to control the dimming controller (161).

The power supply unit (170) is configured to supply power to the lighting unit (150). The power supply unit (170) may include a secondary battery (171) and an adapter (173).

The secondary battery (171) supplies power to the lighting unit (150). For this purpose, the secondary battery (171) can utilize multiple 18650 batteries connected in series or parallel. The secondary battery (171) can be placed inside or outside the case (120) depending on the design of the case (120).

The adapter (173) is configured for recharging the secondary battery (171). The adapter (173) converts power from an external power source into power with a voltage of 5V, 9V, 12V, or 24V and supplies it to the secondary battery (171).

Regarding the size of the stone panel (110), considering the LED module's current consumption, rated voltage, power consumption, and the battery's charging capacity, a width within 1 m2 is appropriate.

The present invention relates to a translucent stone table (100) that maximizes portability and convenience, where it is desirable for the LED chips (153) embedded within the LED module to emit light through a battery for portability. As the number of LED modules required for illumination increases, the number of LED chips (153) also increases. Consequently, with increased power consumption, when using a stone panel (110) larger than approximately 1 m2, portability decreases significantly, and the duration to maintain the same level of illumination decreases rapidly due to increased power consumption from the increased number of illumination modules. In other words, when the size of the stone panel (110) exceeds 1 m2, the installation of more LED modules leads to increased current consumption and power consumption, resulting in faster battery discharge and potential dimming of the LED light.

Therefore, in embodiments of the present invention, when using LED triple modules, it is desirable to use no more than 30 units, taking the aforementioned factors into account.

For example, when using an LED triple module with 0.06 A and an adapter with 2 A, When using 30 LED triple modules, the calculation is: 0.06 A×30 LED triple modules=1.8 A.

To prevent overload, it is advisable to use the adapter only up to 80-90% of its total capacity, hence using no more than 30 LED triple modules is desirable.

The operation of the translucent stone table (100) configured as described above is as follows.

First, the adapter (173) can charge the secondary battery (171) by receiving power from an external power source. Once charging is complete, the adapter (173) can be detached from the secondary battery (171). Consequently, users can move the translucent stone table (100) to desired locations without being restricted by the limited length of the adapter (173) connection cable and eliminate the inconvenience caused by the cable. Meanwhile, the LED chip (153) receives power from the charged secondary battery (171), emits light, projects light (L) towards the stone panel (110), and causes the stone panel (110) to emit light by receiving light (L) from the LED chip (153). Here, the LED chip (153) emits light (L) in a form of diffuse light spreading in multiple directions rather than concentrating in one direction, aiming overall towards the bottom surface (111) of the stone panel (110). Additionally, since the LED module (151) is positioned 5 mm to 200 mm away from the bottom surface (111) of the stone panel (110) as described above, the emitted light (L) from the LED chip (153) reaches the bottom surface (111) of the stone panel (110) in the form of widely dispersed diffuse light rather than concentrated spot light when viewed from above, causing the entire surface of the stone panel (110) to emit light, rather than spot light. Furthermore, the LED chips (153) are evenly distributed on the bottom surface of the housing (121), enabling the upper surface (113) of the stone panel (110) to emit surface light (Ls) more uniformly.

On the other hand, the distance between the bottom surface (111) of the stone panel (110) and the LED module (151) can be adjusted within 5 mm to 200 mm based on factors such as the thickness and light transmittance of the stone panel (110) and the light output of the LED module (151). Experimentally, when the LED module (151) is positioned within 5 mm from the bottom surface (111) of the stone panel (110), the light (L) emitted from the LED module (151) passes through the stone panel (110) causing spot light emission and uneven distribution of light, which can hinder the surface light emission (Ls) characteristics of the stone panel (110).

Contrarily, when the LED module (151) is placed more than 200 mm away from the bottom surface (111) of the stone panel (110), the brightness of the light outputted through the upper surface (113) of the stone panel (110) after penetrating it may significantly diminish. Therefore, the LED module (151) is appropriately positioned within 5 mm to 200 mm from the bottom surface (111) of the stone panel (110), considering the characteristics of the stone panel (110) mentioned above.

Ideally, within 5 mm to 200 mm from the bottom surface (111) of the stone panel (110), a diffuse lens cap LED module with a wide angle (more than 150 degrees) can be properly spaced and positioned, thereby achieving optimized surface light emission (Ls) characteristics of the stone panel (110).

The stone panel (110), which captures light (L) from the arranged lighting unit (150), emits light in the form of surface emission (Ls). This characteristic of surface emission (Ls) is not only due to the configuration of the lighting unit (150) as described but also originates from the composition of the stone panel (110) itself. Specifically, the stone panel (110) can include light-transmitting particles and light-scattering particles as described above. Here, the light-transmitting particles refract light (L) captured from the lighting unit (150) and emit it again, while the light-scattering particles scatter light (L) received from the light-transmitting particles in multiple directions and emit it again. Due to the composition of these light-transmitting particles and light-scattering particles, the light (L) projected towards the stone panel (110) is transformed into diffuse light instead of focused light as it passes through the stone panel (110) multiple times, resulting in the stone panel (110) emitting light in the form of surface emission (Ls).

Meanwhile, the housing (121) can be composed of materials such as acrylic, polymethyl methacrylate (PMMA), or polycarbonate, which can also be configured in a translucent form. In this case, both the stone panel (110) and the housing (121) can emit light in the form of surface illumination from the light (L) outputted from the lighting unit (150). Consequently, not only the top of the stone panel (110) but also the bottom of the case (120) can provide subtle ambient lighting, offering users a more aesthetic illumination.

Additionally, by adding a light-transmitting film or acrylic plate, such as a colored sheet, color film, PVC color film, celluloid, or colored acrylic plate, to the bottom surface of the stone panel (110), various colors of ambient light can be produced. For example, attaching a light-transmitting colored sheet to the underside of the stone panel (110) allows the light emitted by the LED chip (153) to pass through the colored sheet, mixing the color of the sheet with the inherent color of the stone panel (110) as the light passes through it again, creating a soft ambient light.

Thus, various ambient lights can be created using colored sheets without changing the color of the LED chip.

For example, a sheet or acrylic coated with adhesive on one side is adhered to the bottom surface of the stone panel (100).

Moreover, users can adjust the luminance output from the stone panel (110) using a touch dimmer switch, which is also operable by a power button. For instance, a light tap on the dimmer switch toggles the on/off function, while a long press allows for luminance adjustment.

In contrast, users can also adjust the luminance output from the stone panel (110) using a remote control. Specifically, when the user transmits a signal via the remote control to adjust the luminance, the wireless control unit (163) can receive and retransmit the signal to the dimming controller (161) via IR (Infrared Ray) communication. Upon receiving such signals, the dimming controller (161) controls the associated LED module (151) to adjust the luminance output according to the user's preference. This wireless control can be achieved not only through IR communication but also through RF (Radio Frequency), WiFi, or Bluetooth communication methods as mentioned.

Furthermore, the translucent stone table (100) can provide sound to create a more immersive ambiance for users. Specifically, bone conduction speakers (140) attached to the upper surface (113) of the stone panel (110) receive audio signals, convert them into vibration signals, and transmit these vibration signals to the stone panel (110). Upon receiving these vibration signals, the stone panel (110) vibrates accordingly, thereby emitting sound corresponding to the audio signals.

This sound is amplified through the resonance space (123) within the housing (121) facing the bottom surface (111) of the stone panel (110), and the amplified sound is outputted to the exterior of the housing (121) through the sound output hole (125). With this configuration, even with compact bone conduction speakers (140) producing low vibration output, it's possible to provide users with a louder sound output with enhanced bass tones, offering a broader range of sounds.

Subsequently, the translucent stone table (100') according to another embodiment of the present invention will be described with reference to FIGS. 4 and 5.

Figure 4:
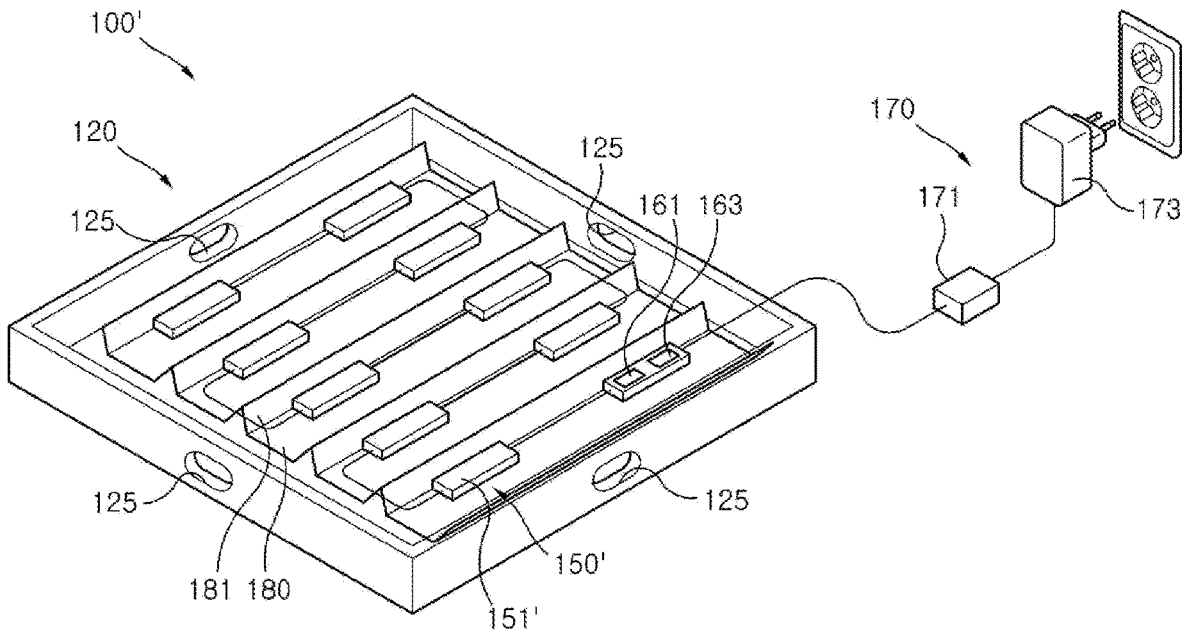
FIG. 4 is a diagram illustrating another embodiment of the translucent stone table according to the present invention.
Figure 5:
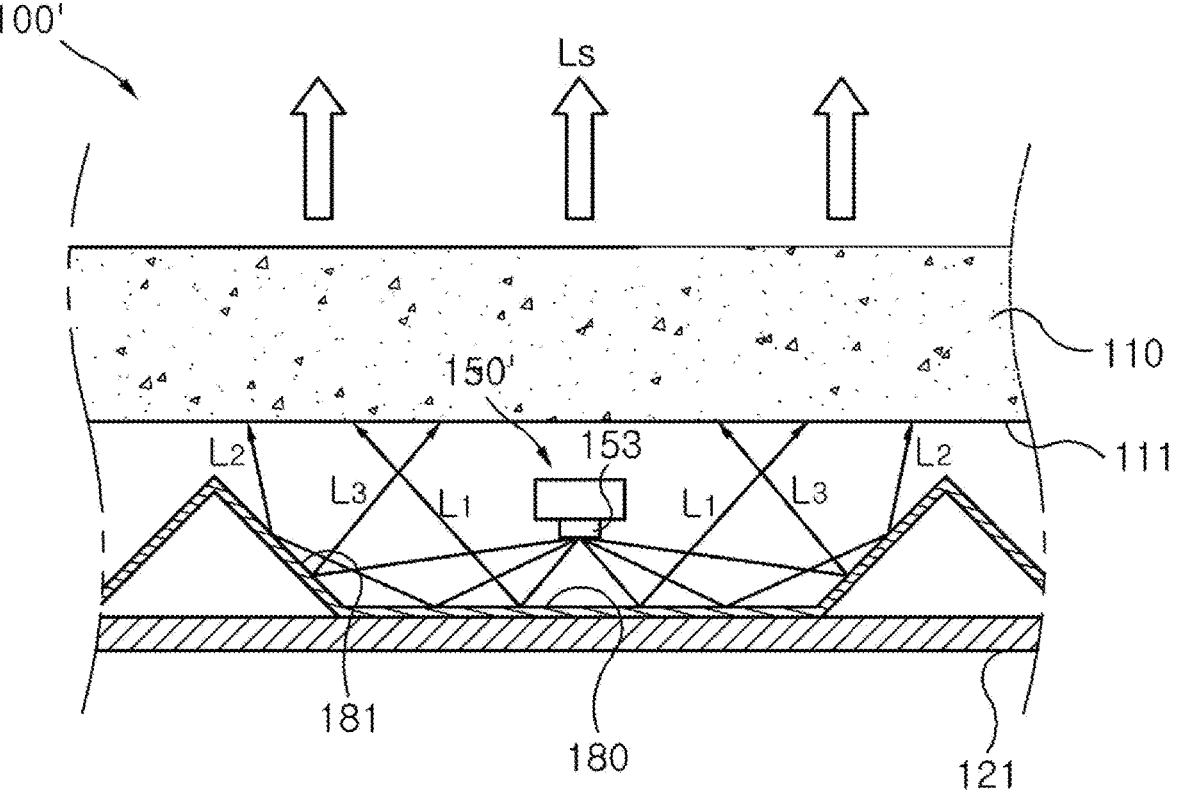
FIG. 5 is a diagram showing the state where light is projected from the translucent stone table of FIG. 4.

FIG. 4 illustrates a diagram for explaining the translucent stone table (100') according to another embodiment of the present invention, and FIG. 5 shows a diagram depicting the state where the light from the translucent stone table (100') of FIG. 4 is projected.

Referring to these drawings, the translucent stone table (100') may further include a floor reflector (180) and an inclined reflector (181). Additionally, the lighting unit (150') is arranged to emit light towards the floor reflector (180), unlike in the aforementioned embodiment.

The floor reflector (180) is placed on the bottom surface of the housing (121), with the LED module (151') being mounted on it.

The inclined reflector (181) is formed to slope upwards towards the stone panel (110) and is integral with the floor reflector (180).

The operation of the translucent stone table (100') with the above configuration is as follows.

First, the LED module (151') emits light towards the floor reflector (180). Here, since the emitted light from the LED module (151') takes the form of diffused light propagating in multiple directions, these lights vary their final arrival points depending on the initial arrival points. Specifically, these lights can be classified into first light (L1) directed towards areas of the floor reflector (180) close to the LED module (151'), second light (L2) directed towards areas of the floor reflector (180) further away, and third light (L3) directed towards the inclined reflector (181).

Here, the first light (L1) directly reaches the bottom surface (111) of the stone panel (110) after being reflected from the floor reflector (180). Additionally, the second light (L2) is reflected from the floor reflector (180), then re-reflected from the inclined reflector (181) before ultimately reaching the bottom surface (111) of the stone panel (110). Furthermore, the third light (L3) reaches the bottom surface (111) of the stone panel (110) after being reflected from the inclined reflector (181).

With this configuration, even if the lighting unit (150') is composed of spot-shaped point light sources like LED chips (153), the emitted lights follow different paths through reflection and re-reflection, evenly spreading across the entire bottom surface (111) of the stone panel (110). As a result, the stone panel (110) efficiently captures light from the lighting unit (150'), resulting in a more uniform surface emission (Ls).

Hereinafter, an explanation will be provided for another embodiment of the translucent stone table (100") according to the present invention, with reference to FIG. 6.

Figure 6:
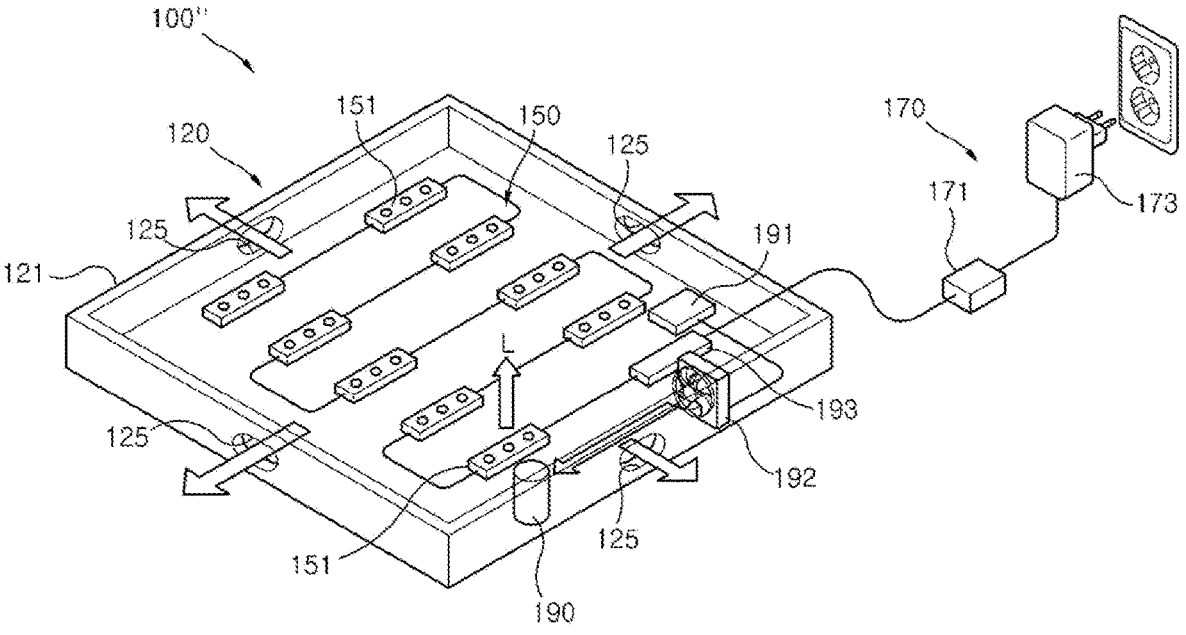
FIG. 6 is a diagram illustrating another embodiment of the translucent stone table according to the present invention.

FIG. 6 is a drawing illustrating another embodiment of the translucent stone table (100") according to the present invention.

Referring to this drawing, the translucent stone table (100") may further include a fragrance storage compartment (190), a thermoelectric module (191), a blower fan (192), and a dimmer (193).

The fragrance storage compartment (190) is positioned on one side of the LED module (151), the thermoelectric module (191) is placed between the LED module (151) and the bottom surface (111) of the stone panel (110), and the blower fan (192) can be arranged to blow towards the fragrance storage compartment (190). The dimmer (193) is configured to control the brightness of the LED module (151).

The operation of the translucent stone table (100") configured as described above is as follows.

First, when the LED module (151) operates to emit light (L), it also generates heat. This heat affects the fragrance storage compartment (190) provided on one side of the LED module (151). Specifically, the fragrance storage compartment (190), upon receiving heat from the LED module (151), functions similarly to a diffuser due to the increased molecular motion of the fragrance stored therein.

Meanwhile, the thermoelectric module (191) can generate electricity due to the heat from the LED module (151). Here, the thermoelectric module (191) refers to a component configured to generate a potential difference in a closed circuit using the Seebeck effect, which utilizes a temperature difference to create a potential difference. In this embodiment, the thermoelectric module (191) is placed between the high-temperature area, the LED module (151), and the relatively low-temperature area, the bottom surface (111) of the stone panel (110), generating a potential difference. Consequently, a current flows through the blower fan (192) connected to the thermoelectric module (191) due to the potential difference generated by the thermoelectric module (191).

As a result of this configuration, the blower fan (192) blows towards the fragrance storage compartment (190), causing the fragrance, whose molecular movement has been intensified by the heat of the LED module (151), to be expelled to the outside of the housing (121) through the sound output hole (125). Consequently, the scent quickly disperses around the translucent stone table (100").

Consequently, the translucent stone table (100") can provide users with visual, auditory, and olfactory sensations through the configuration of the luminous stone panel (110), bone conduction speaker (140), and fragrance diffusion.

Meanwhile, the translucent stone table (100") may be equipped with a manual dimmer (193) instead of the wireless control unit (163) and dimmer controller (161) as described in the previous embodiment. Additionally, when supplied with wired power (220V), except for the secondary battery (171) configuration, a manual dimmer (193) can be utilized by connecting an adapter (173) that directly converts the voltage to 5V, 9V, 12V, or 24V. Alternatively, a conventional SMPS (Switching Mode Power Supply) can be provided to convert the voltage to 5V, 9V, 12V, or 24V to supply power to the LED module (151) more stably. These configurations enable cost savings in manufacturing.

Figure 7:
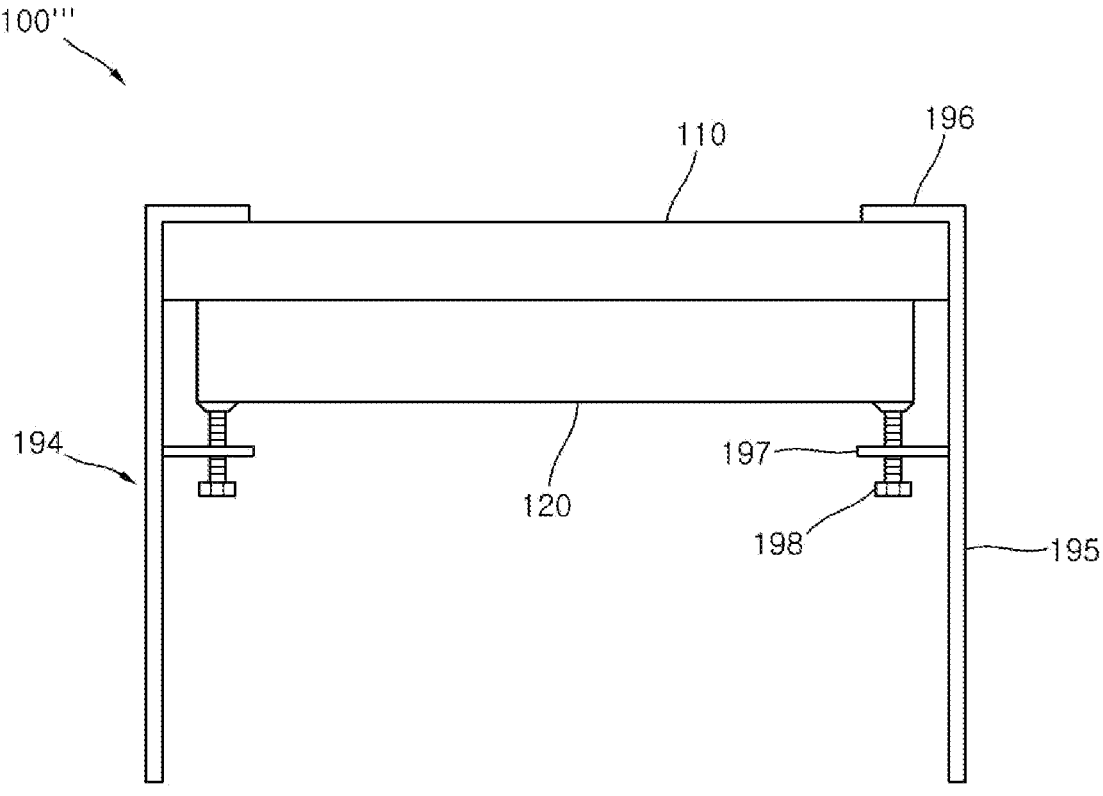
FIG. 7 is a side view of the translucent stone table according to another embodiment of the present invention.

FIG. 7 is a side view of another embodiment of the translucent stone table (100''') according to the present invention.

Referring to this drawing, the translucent stone table (100''') may further include a clamping frame (194). The clamping frame (194) may comprise legs (195), support (196), brackets (197), and clamps (198).

The method of attaching the clamping frame (194) is as follows.

First, position the support (196) on the upper edge of the stone panel (110). In this state, position the case (120) underneath the stone panel (110) and wrap it around, then tighten the clamp (198) located below the case (120). Once the clamp (198) is tightened and the stone panel (110) and the case (120) are snugly attached, position another clamping frame (194) on the other edge of the stone panel (110) and repeat the above process.

With this configuration, the stone panel (110) and the case (120) are fixed together in one piece by the attachment of the clamping frame (194), eliminating the need for separate structures to interlock them. Additionally, the clamping frame (194) with legs (195) of different lengths can be easily replaced, allowing users to adjust the length of the table legs (195) as desired.

Furthermore, although not illustrated, a light sensor unit capable of measuring the illuminance of the space where the stone panel is located can be attached to one side of the translucent stone table. The light sensor unit can measure the ambient illuminance around the light-transmitting stone and output it as a control signal to the dimmer controller. For instance, if the ambient illuminance is very low, the dimmer controller can adjust the luminous intensity output from the LED module accordingly to emit a lower intensity. Additionally, if there are luminescent objects in the vicinity, it can control the output of light with higher illuminance than that provided by the luminescent object.

The aforementioned light sensor unit may additionally be equipped with a CMOS (Complementary Metal-Oxide Semiconductor) image sensor. The CMOS image sensor can be configured to detect the color of ambient light and sense the color information of the ambient light around the translucent stone table. By transmitting the color information of ambient light to the dimmer controller, it can output light of the same color as ambient light or complementary light to ambient light. For example, if the ambient light is red, it can output complementary light in cyan, or if the ambient light is orange, it can output blue light. By outputting light of a color that contrasts sharply with ambient light, objects placed on the translucent stone table can be more distinctly recognized.

The translucent stone table described above is not limited to the configurations and operations of the embodiments described above. The embodiments described above may be selectively combined in whole or in part to form various modifications.

Although the embodiments of the present invention have been described with reference to the attached drawings. However, those skilled in the art to which the present invention pertains will understand that the present invention can be implemented in other specific forms without changing the technical concept or essential features of the invention. Therefore, the embodiments described above should be understood as exemplary in all respects, and not restrictive.

The invention claimed is:

1. A translucent stone table comprising:
a stone panel having a bottom surface;
a case supporting the stone panel;
a lighting unit located within the case and configured to project light towards the stone panel to allow the stone panel to emit light; and
a bone conduction speaker detachably mounted on the stone panel to allow the stone panel to vibrate and produce sound,
wherein the case comprises a housing supporting the stone panel, a resonance space formed within the housing to amplify sound output from the stone panel, and a sound output hole formed penetratingly in the housing to output sound amplified by the resonance space to the exterior of the housing.

2. The translucent stone table of claim 1,
wherein the lighting unit is arranged at a distance of 5 mm to 200 mm from the bottom surface of the stone panel, and wherein the stone panel is configured to refract light received from the lighting unit and emit light in the form of surface illumination, comprising light-transmitting particles that refract light received from the lighting unit and scatter light in multiple directions.

3. The translucent stone table of claim 1,
further comprising a bottom reflector plate disposed within the case and on which the lighting unit is mounted; and an inclined reflecting plate extending from the bottom reflector plate and inclined upward toward the stone panel to receive and reflect light reflected from the bottom reflector plate towards the stone panel, wherein the lighting unit is installed to emit light towards the bottom reflector plate.

4. The translucent stone table of claim 1,
wherein the lighting unit comprises an LED (light emitting diode) module for projecting light towards the stone panel, a dimming controller connected to the LED module to control the luminous intensity output from the LED module, and a wireless control unit connected to the dimming controller and configured to control the dimming controller via one or more wireless communication methods selected from RF (radio frequency), WiFi, bluetooth, or IR (infrared) communication.

5. The translucent stone table of claim 1, further comprising a rechargeable secondary battery for supplying power to the lighting unit, and an adapter connected to the secondary battery for converting power supplied from an external power source into power with a voltage of 5V, 9V, 12V, or 24V to supply to the secondary battery.

6. The translucent stone table of claim 1, further comprising:

a thermoelectric module disposed between the bottom surface of the stone panel and the lighting unit;

a blower fan disposed within the case; and a fragrance storage compartment disposed on one side of the lighting unit, wherein power generated by the thermoelectric module is supplied to the blower fan, and the blower fan is configured to blow air towards the fragrance storage compartment.

* * * * *